(12) United States Patent
Espinoza-Ibarra et al.

(10) Patent No.: US 7,076,671 B2
(45) Date of Patent: *Jul. 11, 2006

(54) MANAGING AN OPERATING FREQUENCY OF PROCESSORS IN A MULTI-PROCESSOR COMPUTER SYSTEM

(75) Inventors: Ricardo Espinoza-Ibarra, Carmichael, CA (US); Andrew H. Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 573 days.

This patent is subject to a terminal disclaimer.

(21) Appl. No.: 10/216,283

(22) Filed: Aug. 12, 2002

(65) Prior Publication Data

US 2004/0030940 A1 Feb. 12, 2004

(51) Int. Cl.
*G06F 1/26* (2006.01)
(52) U.S. Cl. .............. 713/300; 713/322; 713/600
(58) Field of Classification Search ............... 713/300, 713/320, 322, 375, 600
See application file for complete search history.

(56) References Cited

U.S. PATENT DOCUMENTS

| | | | | |
|---|---|---|---|---|
| 5,396,635 A | * | 3/1995 | Fung | 713/323 |
| 5,491,787 A | * | 2/1996 | Hashemi | 714/11 |
| 6,795,928 B1 | * | 9/2004 | Bradley et al. | 713/320 |
| 6,804,790 B1 | * | 10/2004 | Rhee et al. | 713/320 |
| 6,836,849 B1 | * | 12/2004 | Brock et al. | 713/310 |
| 6,859,882 B1 | * | 2/2005 | Fung | 713/300 |
| 2003/0120963 A1 | * | 6/2003 | Jahnke | 713/322 |

FOREIGN PATENT DOCUMENTS

| | | |
|---|---|---|
| DE | 19600210 | 7/1996 |
| WO | WO 96/30832 | 10/1996 |
| WO | WO 02/39242 | 5/2002 |
| WO | WO 03/027820 | 4/2003 |

OTHER PUBLICATIONS

Search Report issued on Jan. 29, 2004 in counterpart foreign application in GB under application No. 315093.5.

* cited by examiner

*Primary Examiner*—Chun Cao

(57) ABSTRACT

In a system, method and apparatus for the frequency management of processors in a multi-processor (MP) computer system, a first processor requiring a first level of performance is operated at a specific frequency and consumes a portion of the thermal and power budget. A second processor requiring a second level of performance is operated at a second specific frequency and consumes a portion of the thermal and power budget. The overall power and thermal budget in the multi-processor computer system is maintained under the different operating frequencies.

22 Claims, 6 Drawing Sheets

800

900

MANAGING AN OPERATING FREQUENCY OF PROCESSORS IN A MULTI-PROCESSOR COMPUTER SYSTEM

CROSS-REFERENCE TO RELATED APPLICATIONS

This application is related to U.S. patent application Ser. No. 10/216,437, entitled "SYSTEM, METHOD AND APPARATUS FOR THE FREQUENCY MANAGEMENT OF BLADES IN A BLADED ARCHITECTURE BASED ON PERFORMANCE REQUIREMENTS" to Andrew H. BARR, et al.; U.S. patent application Ser. No. 10/216,438, entitled "SYSTEM AND METHOD FOR THE FREQUENCY MANAGEMENT OF COMPUTER SYSTEMS TO ALLOW CAPACITY ON DEMAND" to Andrew H. BARR, et al.; U.S. patent application Ser. No. 10/216,234, entitled "SYSTEM AND METHOD FOR LOAD DEPENDENT FREQUENCY AND PERFORMANCE MODULATION IN BLADED SYSTEMS" to Ricardo ESPINOZA-IBARRA, et al.; U.S. patent application Ser. No. 10/216,284, entitled "VOLTAGE MANAGEMENT OF BLADES IN A BLADED ARCHITECTURE BASED ON PERFORMANCE REQUIREMENTS" to Andrew H. BARR, et al.; U.S. patent application Ser. No. 10/216,286, entitled "VOLTAGE MODULATION IN CONJUNCTION WITH PERFORMANCE OPTIMIZATION AT PROCESSOR LEVEL" to Andrew H. BARR, et al.; U.S. patent application Ser. No. 10/216,285, entitled "SYSTEM AND METHOD FOR MANAGING THE OPERATING FREQUENCY OF PROCESSORS OR BLADES" to Ricardo ESPINOZA-IBARRA, et al.; U.S. patent application Ser. No. 10/216,229, entitled "SYSTEM AND METHOD FOR MANAGING THE OPERATING FREQUENCY OF BLADES IN A BLADED-SYSTEM" to Ricardo ESPINOZA-IBARRA, et al.; U.S. patent application Ser. No. 10/216,233, entitled "VOLTAGE MANAGEMENT OF PROCESSORS IN A BLADED SYSTEM BASED ON LOADING" Andrew H. BARR, et al.; U.S. patent application Ser. No. 10/216,232, entitled "SYSTEM AND METHOD FOR VOLTAGE MANAGEMENT OF A PROCESSOR TO OPTIMIZE PERFORMANCE AND POWER DISSIPATION" to Andrew H. BARR, et al., and U.S. patent application Ser. No. 10/216,435, entitled "MANAGEMENT OF A MEMORY SUBSYSTEM" to Andrew H. BARR, et al., all of which are concurrently herewith being filed under separate covers, the subject matters of which are herein incorporated by reference.

BACKGROUND

In a multi-processor (MP) architecture, multiple processors are present in the same system. Associated with the system are a specific set of power and thermal requirements. Known power limiting strategies include powering down a CPU functional unit, e.g., a floating-point unit or an on-die cache, or trading off speed for reduced power consumption in a hard drive. Tight power budgets and thermal restrictions may also limit the maximum frequency at which the processors in a multi-processor system are run. Thus, the optimal performance and capacity of the processors is limited. Specifically, these requirements put a limit on the amount of power that can be consumed by the processors.

Though MP systems provide many advantages, several engineering challenges arise when using MP systems. Among these challenges is the challenge of designing and operating a system such that sufficient heat is dissipated in the system. To address heat dissipation challenges, MP systems are designed within an underlying power and thermal envelope. For example, when a chassis that hosts a MP system has a limited amount of airflow available to cool the processors (i.e., when the system can only dissipate a limited amount of heat), then the chassis is designed for a limited amount of power consumption and an associated limited performance of the processors.

Prior solutions included running the processors at a sub-optimal performance level to meet the overall chassis power and thermal cooling budget, adding fans and extra control circuitry, limiting the number of I/O cards, or other useful features in the system, and reducing the power budget available for other features in the system.

SUMMARY

In one embodiment of the frequency management of processors in a multi-processor, (MP) system, a first processor requiring a first level of performance is operated at a specific frequency and consumes a portion of the thermal and power budget of the chassis. A second processor requiring a second level of performance is operated at a second specific frequency and consumes a portion of the thermal and power budget. The overall power and thermal budget in the multi-processor computer system is maintained under the different operating frequencies.

In another embodiment of the frequency management of processors in a multi-processor system, a master processor requiring a first level of performance is operated at a specific frequency and consumes a portion of the thermal and power budget. A slave processor requiring a second level of performance is operated at a second specific frequency and consumes a portion of the thermal and power budget. In addition, a management means is used to maintain the frequency level of the master processor and/or the slave processor.

DESCRIPTION OF THE DRAWINGS

The detailed description will refer to the following drawings, wherein like numerals refer to like elements, and wherein.

DETAILED DESCRIPTION

Figure 1:
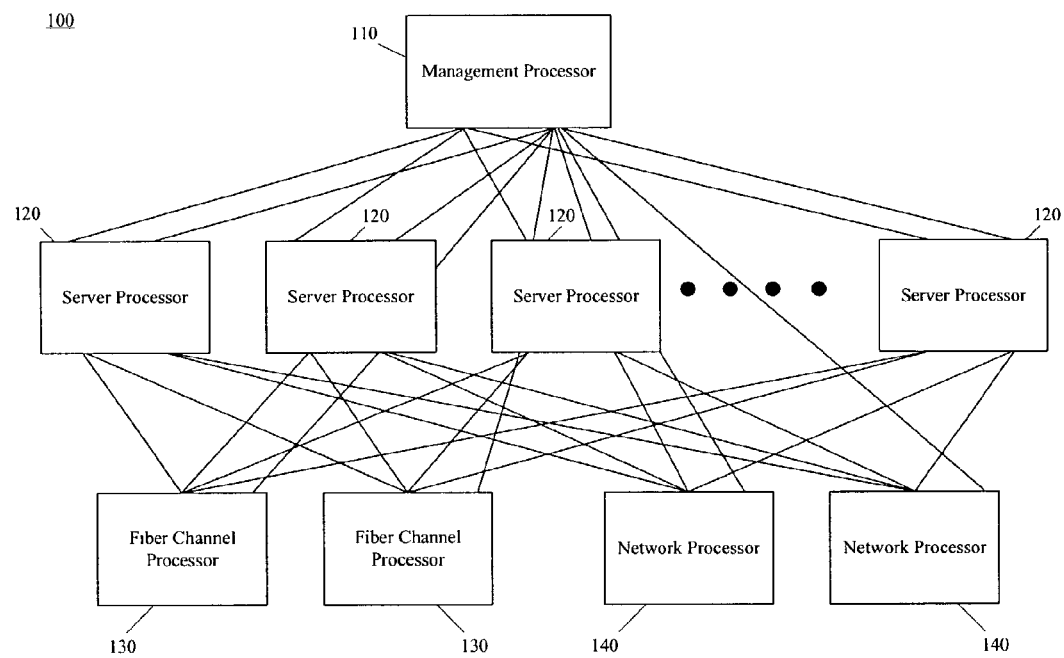
FIG. 1 shows a block diagram depicting one embodiment of the basic modular building blocks of a bladed architecture system.

The preferred embodiments of the frequency management of processors in a multi-processor (MP) system, will now be described in detail with reference to the following figures, in which like numerals refer to like elements. With reference to FIG. 1 of the Drawings, there is illustrated therein a block diagram depicting one embodiment of the basic modular building blocks of a bladed architecture system, as generally designated by the reference numeral 100. Bladed architecture is one example of the many different types of computer architectures that the disclosure may benefit. It is to be appreciated that the innovations described herein may be applied to a variety of MP servers or MP computers.

A management blade 110 supervises the functions of the chassis and provides a single interface to the consoles of all the servers installed. As shown in FIG. 1, server blades 120 are in communication with the management blade 110. The server blades 120 are, in turn, in communication with other blades that perform specific functions. For example, as seen in FIG. 1, server blades 120 are in communication with fiber channel blades 130 and network blades 140. It is to be appreciated that the various blades in a bladed architecture system may be processor blades, server blades, network blades, storage blades or storage interconnect blades, etc.

Performance optimization at the processor level allows for the intelligent usage of resources by allowing individual processors in a multi-processor (MP) arrangement to be configured according to their specific performance level and needs. By taking advantage of processors' requirements for higher or lower performance, each processor is allowed to run at an increased or decreased frequency, and thus consume more or less of the chassis thermal and power budget.

Processors that run background processes that require a lower level of performance, e.g. slave processors, are run at a lower frequency and thus consume less of the chassis thermal and power budget. Processors that run processes that require a higher level of performance are run at a higher frequency and thus consume more of the chassis thermal and power budget. In either scenario, the overall system's thermal and power requirements are still met with a more optimal overall processor performance. In PA architectures, the processor core frequency is asynchronous to the bus operating frequency. Thus, a change to the processor core frequency can be made with virtually no impact. One skilled in the art would readily recognize that these principles can be applied to DEC Alpha, MIPS, PowerPC, SPARC, IA-32 and IA-64 architectures, and other processors from other MP architectures as well.

FIGS. 2–7 illustrate various methods for the frequency management of processors in a MP system. In some architectures, the processor core frequency of the CPU is asynchronous to the bus operating frequency; therefore, a change to the processor core frequency can be made independently of the system bus frequency. Currently, Hewlett Packard uses the SPHYR-T ASIC as a frequency-synthesizer for generating the processor clock of the PA-RISC systems. However, one skilled in the art would readily recognize that other synthesizers may also be used. In other embodiments of processor architectures, e.g., IA-32 and IA-64, the processor core frequency of the CPU is not necessarily asynchronous to the bus operating frequency. In IA processors the processor core frequency runs at a programmable multiple of the bus operating frequency. Managing the operating frequency of individual processors can be applied to both architectures by modifying the output of the clock chip, and thus, setting the processor frequency accordingly.

Generally, frequency synthesizer chips used to generate the processor's clocks have parallel or serialized configuration bits that allow one to choose the ratio of the input clock to the output clock (synthesized frequency). This allows one to run the processors at a different frequency upon reboot. The frequency synthesizer typically has an input frequency from a core crystal. Through controlling the serial or parallel pins, the frequency synthesizer provides the output frequency ratio that is sent to the processors.

One skilled in the art would also appreciate that if multiple frequency synthesizers are utilized, i.e., two (for a 2-way system) or N (for an N-way system), to generate the processor's clocks, the processors are able to operate at different frequencies within the range of frequencies supported by the processor. FIGS. 2–7 illustrate different methodologies of the how the ratio pins of the different frequency synthesizers can be controlled.

Figure 2:
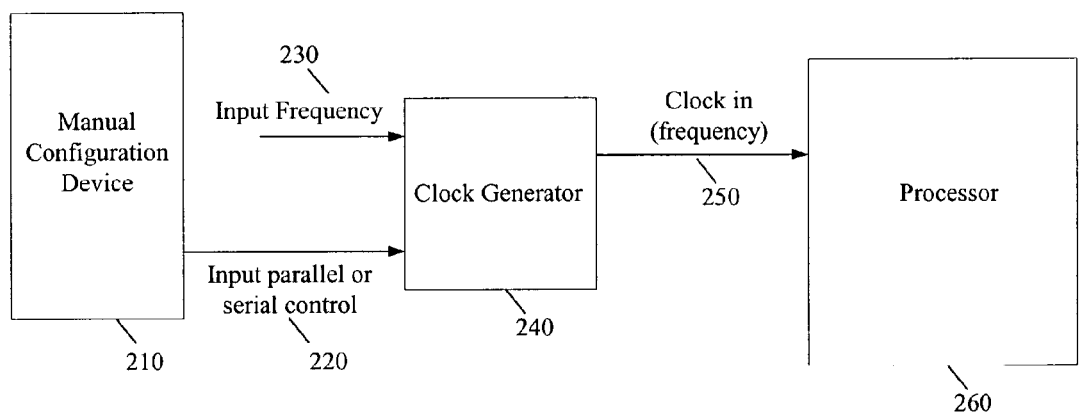
FIG. 2 illustrates a block diagram depicting one methodology of managing the operating frequency of individual processors by use of a manual configuration device.

With reference now to FIG. 2 of the Drawings, there is illustrated therein a block diagram depicting one methodology of managing the operating frequency of individual processors in a MP system by use of a manual configuration device 210, as generally designated by the reference numeral 200. As seen in the figure, the manual configuration device 210 is added to a readily accessible part of the system. Thus, the operator is allowed to set the frequency of the processors upon reboot of the unit, based on predetermined performance requirements. One of ordinary skill in the art would recognize that there are many common manual configuration devices that are capable of performing the desired function, e.g., dip switches, jumpers installed over pin headers, rotational configuration switches, and solder bridges, etc. The input frequency 230 and signal 220 from the manual configuration device 210 are used to generate an output frequency 250 at the clock generator, or frequency synthesizer 240 that is used by processor 260. It is to be appreciated that this method of changing the frequency of the processor by use of a manual configuration device, and the other methods described herein below, may be applied to various types of MP architectures.

Figure 3:
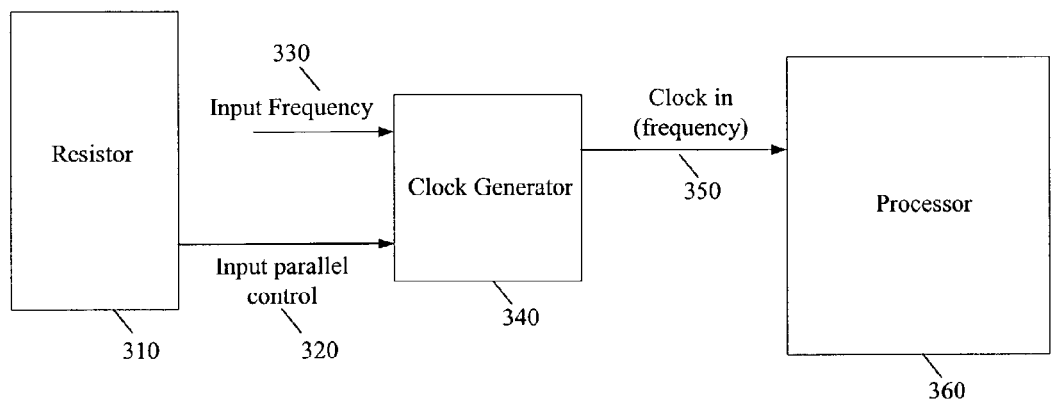
FIG. 3 illustrates a block diagram depicting another method of managing the operating frequency of individual processors by use of resistors.

With reference now to FIG. 3 of the Drawings, there is illustrated therein a block diagram depicting another method of managing the operating frequency of individual processors in a MP system, as generally designated by the reference numeral 300. Method 300 manages the operating frequency of individual processors by use of a resistor 310. As is known in the art, resistor 310 may be a configuration resistor. As seen in FIG. 3, the resistor 310 is added to a readily accessible part of the system. Thus, the operator is allowed to set the frequency of the processors upon reboot of the unit, based on predetermined performance requirements. An input frequency 330 and signal 320 from the resistor 310 are used to generate an output frequency 350 at a clock generator 340 that is used by processor 360.

Figure 4:
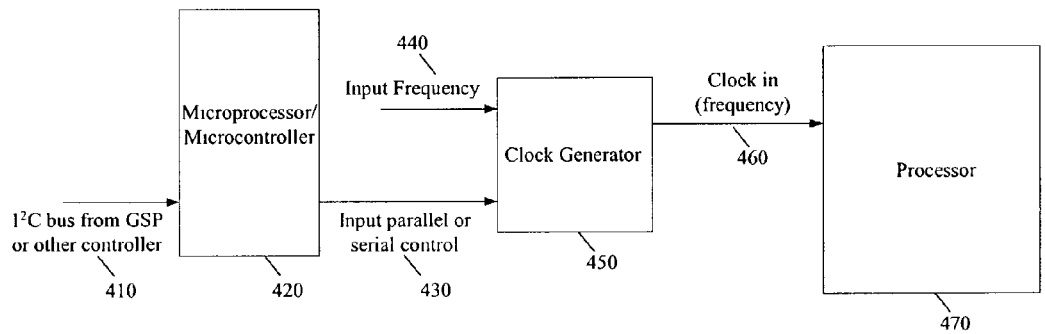
FIG. 4 illustrates a block diagram depicting another method of managing the operating frequency of individual processors by use of a microcontroller or microprocessor.

With reference now to FIG. 4 of the Drawings, there is illustrated therein a block diagram depicting the method of managing the operating frequency of processors in a MP system by use of a microcontroller or microprocessor 420, as generally designated by the reference numeral 400. The microcontroller or microprocessor 420 is used to interface with the user of the system to ask for the specific frequency at which each processor should run. As seen in FIG. 4, microcontroller or microprocessor 420 receives a signal on an I²C (Inter-IC) bus 410 from a GSP (Guardian Service Processor) or other controller. As is known in the art, an I²C bus is a bi-directional two-wire serial bus that provides a communication link between integrated circuits Further, a person of ordinary skill in the art would readily recognize that other control buses could perform the same functions and be substituted for the I²C bus described herein. The microcontroller or microprocessor 420 outputs a parallel or serial control 430, based upon the specific frequency designated by the user. A clock generator 450 uses an input frequency 440 and parallel or serial control signal 430 to generate an output frequency 460 used by a designated processor 470. The use of the microcontroller or microprocessor 420 allows the user to control the frequency synthesizers in a more transparent way than the above described register and manual configuration device methods, i.e., the user does not necessarily need to know how the settings of the configuration bits will affect the output.

Figure 5:
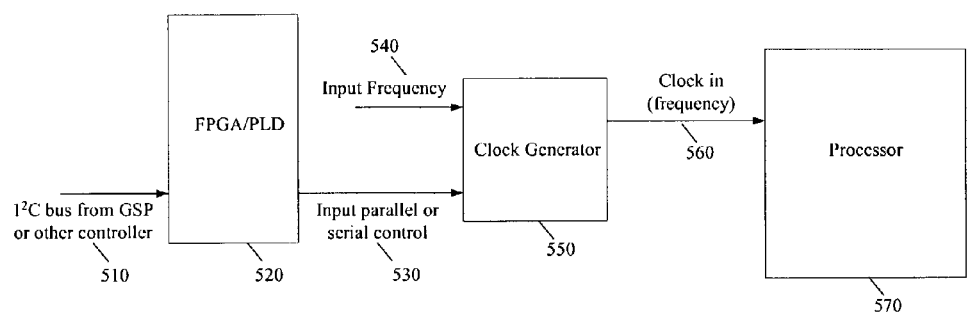
FIG. 5 illustrates a block diagram depicting another method of managing the operating frequency of individual processors by use of a field-programmable gate array (FPGA) or programmable logic device (PLD)

With reference now to FIG. 5 of the Drawings, there is illustrated therein a block diagram depicting the method of managing the operating frequency of processors in a MP system by use of a FPGA (field-programmable gate array) or PLD (programmable logic device) 520, as generally designated by the reference numeral 500. As is known to those skilled in the art, a FPGA is a chip that can be programmed in the field after manufacture. The FPGA or PLD 520 is used to receive commands from a higher-level device, e.g., the GSP via an I²C bus 510, to control the configuration bits for the frequency synthesizer (or each synthesizer). As seen in FIG. 5, a clock generator 550, uses an input frequency 540 and the control from the FPGA/PLD 530 to generate an output frequency 560 used by a processor 570. Like the use of the microcontroller/microprocessor 420 described in FIG. 4, the FPGA/PLD 520 allows the user to control the frequency synthesizers in a more transparent way, i.e., the user does not necessarily need to know how the settings of the configuration bits will affect the output.

Figure 6:
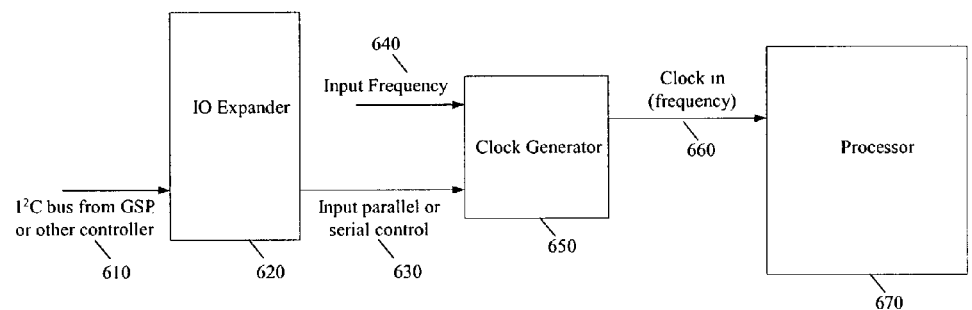
FIG. 6 illustrates a block diagram depicting another method of managing the operating frequency of individual processors by use of an I/O-Expander chip (I/OX)

With reference now to FIG. 6 of the Drawings, there is illustrated therein a block diagram depicting the method of managing the operating frequency of the processors by use of an I/O-Expander chip (I/OX) 620, as generally designated by the reference numeral 600. As known in the art, an I²C based I/OX 620 is an inexpensive and simple solution that can be used to transparently control each frequency synthesizer. I/OX chips 620 have I/O ports, which can be forced to a particular state by writing to the I/OX through an I²C command. Since I/OX chips typically have multiple I/O ports, it is to be appreciated that one I/OX can be used to control multiple frequency synthesizers individually.

Since I/OX chips are I²C-based, they can be controlled by any device that supports an I²C interface. In Hewlett Packard's PA-RISC Blades, a logical such device would be the service processor, or GSP, of the PA Blade. The user-friendly interface of the GSP can be used to transparently allow the customer to control the frequency of the processors without need of any low-level information, e.g., bit-settings. The input from the GSP is designated in FIG. 6 by reference numeral 610. The user at the GSP inputs commands to increase the frequency of the processor. The GSP then delivers the required bits to change the ratio of the frequency generator, so that the processor will run at the desired level. The bit stream 610 is received by the I/OX 620. A clock generator 650 then uses an input frequency 640 and a control signal 630 to generate an output frequency 660 used by the processor 670.

Figure 7:
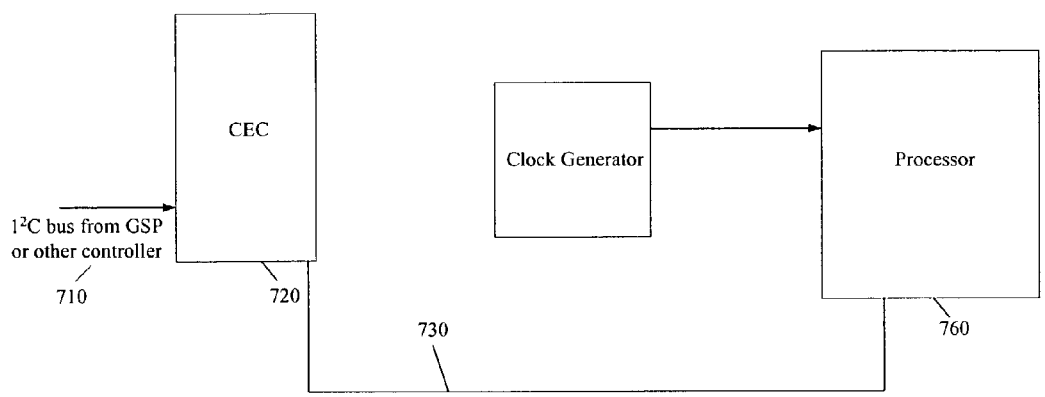
FIG. 7 illustrate therein a block diagram depicting the methods of managing the operating frequency of individual processors in an IA based architecture system.

With reference now to FIG. 7 of the Drawings, there is illustrated therein a block diagram depicting the methods of managing the operating frequency of individual processors in an IA based architecture system, as generally designated by the reference numeral 700. As shown above, PA-based architectures have two frequency inputs that are taken into the processor: the processor core input and the bus input. In IA-based architectures the serial or parallel control is not modulated. IA-based architectures program the processor core frequency to generate a multiple of the bus frequency. The programming of the processor core frequency is done during early bus initialization using multipurpose bus lines 730. This is typically controlled by the main core chipset that sits on the processor bus (CEC) 720. Generally, a user interface, e.g., a GSP 710, is used to program the CEC 720 to generate the appropriate control signal 730 during early system and bus initialization. The bus frequency is multiplied for a larger ratio to generate a higher frequency, performance and power, or for a smaller ratio to generate a lower frequency, performance and power, depending on the application at the particular processor 760.

Figure 8:
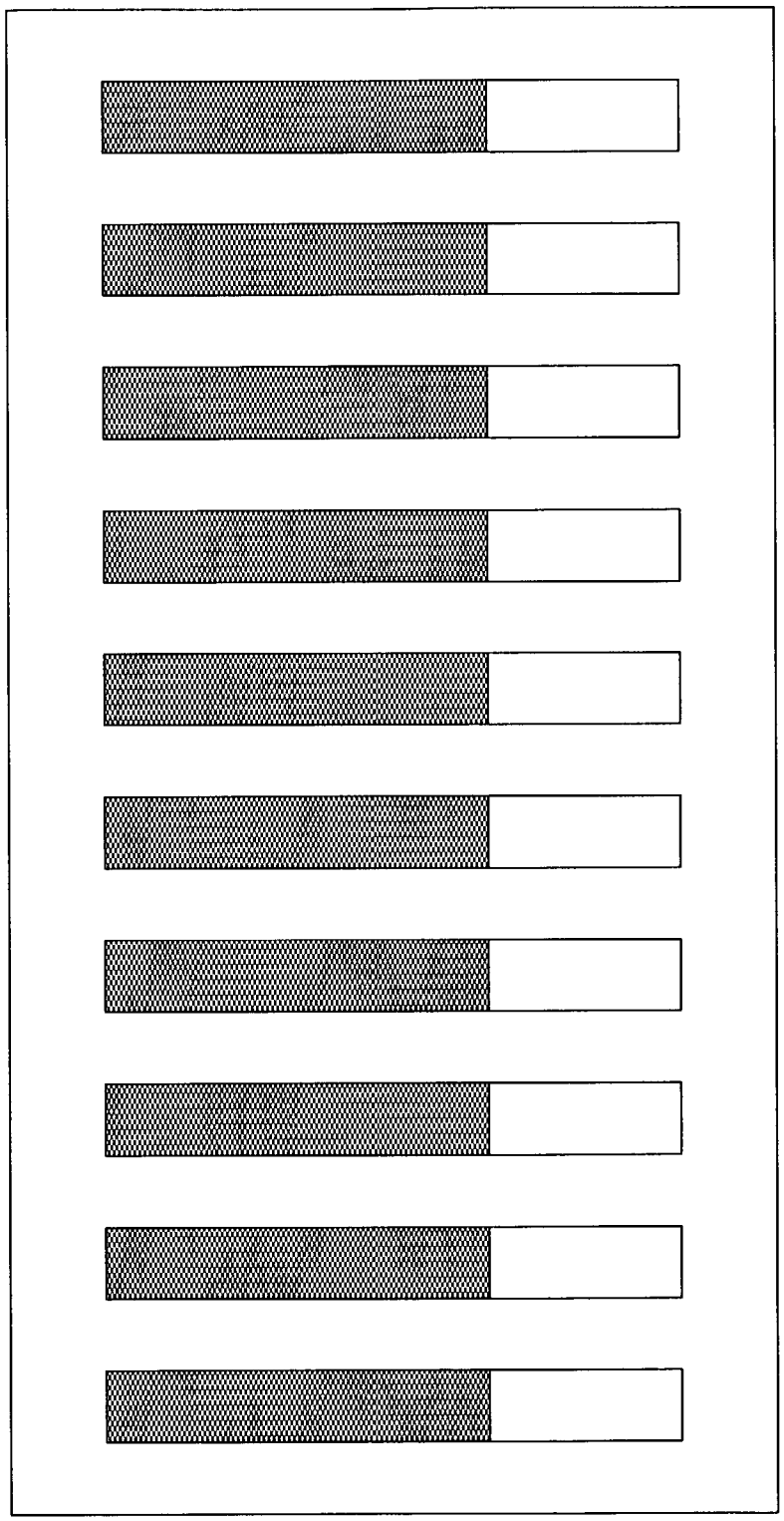
FIG. 8 illustrates a block diagram depicting a series of processors in a MP system operating at the same frequency level.

With reference now to FIG. 8 of the Drawings, there is illustrated therein a block diagram depicting a series of processors in a MP system running at the same frequency, as generally designated by the reference numeral 800. The shading of the individual processors indicates that each individual processors is operating at the same frequency level. Operating processors at the same frequency is typical in current MP architecture systems. In addition, the shading illustrates that each processors is operating at a level below the maximum level in order to remain under the maximum power allocated to the system as a whole. As discussed, MP server systems are limited by an underlying power and thermal envelope. This is due to the heat produced and to the limited dimensions in the system. When the system consumes a given amount of the power, the system is typically limited in the amount of airflow that is available to cool the processors. As a result, the power limitation limits the frequency that the processors can run, and thus, limits the performance. The processors are therefore limited in their ability to operate at optimal performance and capacity because the processors are configured to operate at the same frequency—a frequency below their maximum level.

Figure 9:
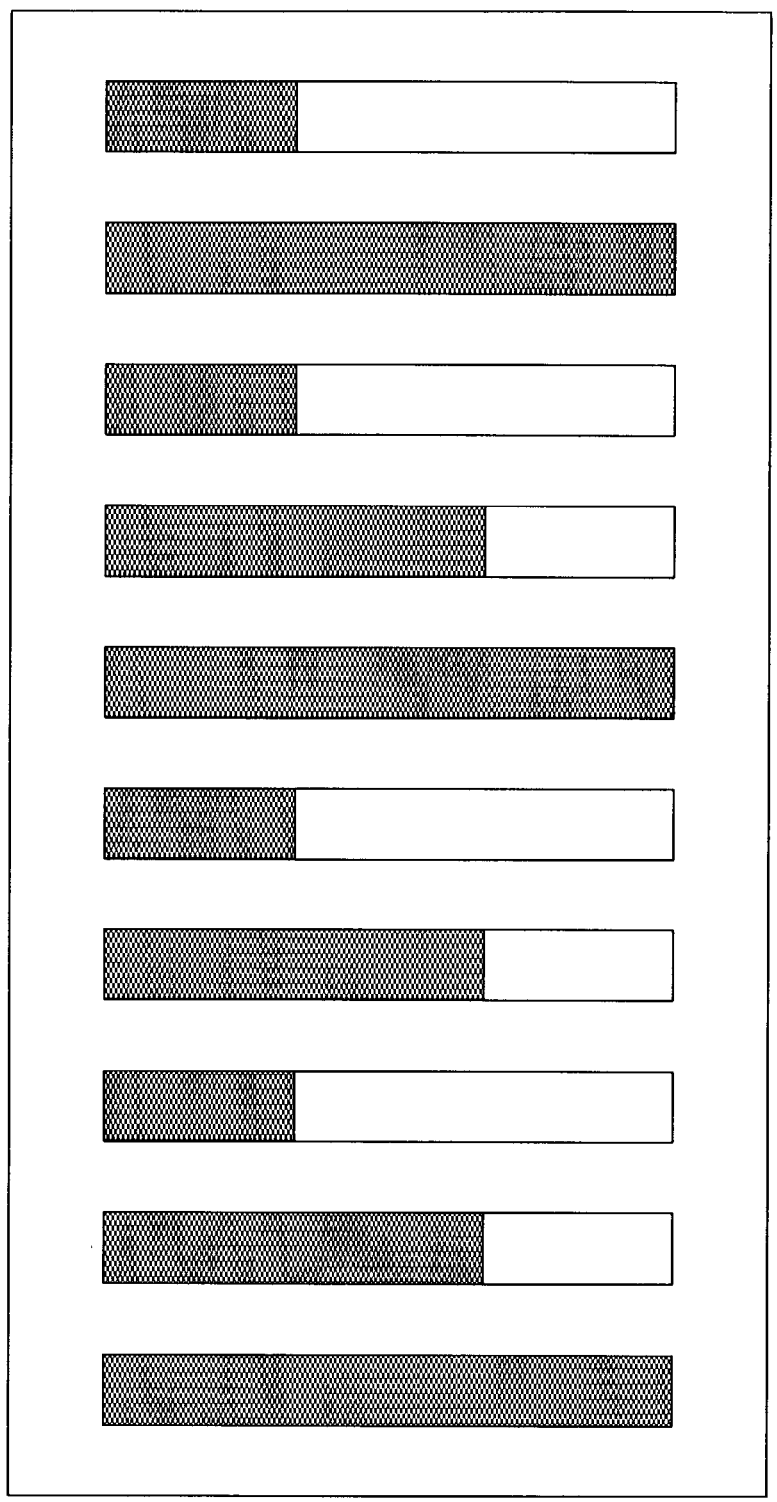
FIG. 9 illustrates a block diagram depicting a series of processors in a MP system operating at the different frequency levels.

With reference now to FIG. 9 of the Drawings, there is illustrated therein a block diagram depicting processors in a MP system running at different frequencies, as generally designated by the reference numeral 900. The new configuration of processor frequencies shown in the figure is based upon intelligent usage of resources by allowing individual processors in the MP arrangement to be configured according to their specific performance level and needs. The shading in the figure indicates the level of the frequency at which the processor is being run, e.g., processors with more shading are being run at a higher frequency.

By taking advantage of process requirements for higher or lower performance, each processor is run at an increased or decreased frequency, and thus consumes more or less of the chassis thermal and power budget. Slave processors that run background processes require a lower level of performance and are run at a lower frequency. Thus, the slave processors consume a smaller portion of the chassis thermal and power budget. Master processors, or monarch processors, that run processes that require a higher level of performance are run at a higher frequency. Thus, the master processors consume a larger portion of the chassis thermal and power budget. Additionally, when the relative performance requirements on the processors change, the frequencies can be changed, thus changing the performance and thermal and power budget allocation. Running the individual processors at different frequencies still meets the system's overall thermal and power requirements and a more optimal overall processor performance is attained.

It is to be appreciated that the principles disclosed herein may be applied to a system comprised of processors that share a common chassis or to an architecture system that spans multiple chassis. That is, the principles may be applied to systems that are divided by either a physical or logical partition. For example, physically, a system may include three chassis, with each chassis having eight processors. Logically, the same system could be partitioned into five different web servers for five different customers. Power constraints within a chassis typically concern the physical partition of the system. Power constraints imposed on a customer or application that is located in multiple chassis, typically concern logical partitions. One of ordinary skill in the art would readily recognize that the innovations described above may be applied to both physically and logically partitioned architectures.

While the frequency management of processors in a MP system has been described in connection with exemplary embodiments, those skilled in the art will understand that many modifications in light of these teaching are possible, and this application is intended to cover any variation thereof.

For example, the disclosed system and method has been generally applied to bladed architecture systems in some of the embodiments above. Other computer architectures could likewise be used. Thus, the MP architectures shown and referenced generally throughout this disclosure, and unless specifically noted, are intended to represent any and all architectures appropriate to perform the desired functions. Likewise, there are disclosed several I²C devices that perform various operations. The specific I²C device is not meant to limit the disclosure. Thus, it is not applicant's intention to limit this disclosure to any particular form of I²C device or specific architecture.

Further examples exist throughout the disclosure, and it is not applicant's intention to exclude from the scope of this disclosure the use of structures, materials, or acts that are not expressly identified in the specification, but nonetheless are capable of performing a claimed function.

The invention claimed is:

1. A method for managing an operating frequency of processors in a multi-processor computer system, said method comprising the steps of:
    operating a first processor at a first frequency, said first processor requiring a first level of performance, wherein said first processor consumes a first portion of a thermal and power budget in said multi-processor computer system based upon said first level of performance;
    operating a second processor at a second frequency, said second processor requiring a second level of performance, wherein said second processor consumes a second portion of the thermal and power budget in said multi-processor computer system based upon said second level of performance; and
    using manual adjustment means, modulating at least one of said first frequency and said second frequency in said multi-processor based computer system to maintain the thermal and power budget in said multi-processor computer system and optimize performance in said multi-processor computer system.

2. The method according to claim 1, wherein said first processor runs processes that require a higher level of performance than said second processor, and said first processor is run at a higher frequency than said second processor.

3. The method according to claim 2, wherein said first portion of the thermal and power budget is greater than said second portion of the thermal and power budget.

4. The method according to claim 1, wherein said second processor runs processes that require a lower level of performance than said first processor, and said second processor is run at a lower frequency than said first processor.

5. The method according to claim 4, wherein said second portion of the thermal and power budget is less than said first portion of the thermal and power budget.

6. The method according to claim 1, wherein said multi-processor computer system is based on an architecture wherein processor core frequency is asynchronous to bus operating frequency.

7. The method according to claim 1, wherein the thermal and power budget allocation is altered according to a change in performance requirements of at least one of said first processor or said second processor in said multi-processor computer system.

8. The method according to claim 1, wherein said multi-processor computer system is physically partitioned.

9. The method according to claim 1, wherein said multi-processor computer system is logically partitioned.

10. A multi-processor computer system comprising:
    a first processor hosting applications that require a first power allocation, said first processor operated at a first frequency, wherein said first processor consumes a first portion of a thermal and power budget in said multi-processor computer system based upon said first power allocation;
    a second processor hosting applications that require a second power allocation, said second processor operated at a second frequency, wherein said second processor consumes a second portion of the thermal and power budget in said multi-processor computer system based upon said second power allocation; and
    manual adjustment means for modulating at least one of said first frequency and said second frequency, wherein an overall thermal and power budget in said multi-processor computer system is maintained and performance in said multi-processor computer system is optimized.

11. The multi-processor computer system according to claim 10, wherein said multi-processor computer system is based on an architecture in which processor core frequency is asynchronous to bus operating frequency.

12. The multi-processor computer system according to claim 10, wherein a thermal and power budget allocation is altered according to a change in the performance requirements for said first processor and said second processor in said multi-processor computer system.

13. The multi-processor computer system according to claim 10, wherein said first processor runs processes that require a higher level of performance than said second processor, and said first processor is run at a higher frequency than said second processor.

14. The multi-processor computer system according to claim 13, wherein said first processor consumes more of the thermal and power budget than said second processor.

15. The multi-processor computer system according to claim 10, wherein said second processor runs processes that require a lower level of performance than said first processors, and said second processor is run at a lower frequency than said first processor.

16. The multi-processor computer system according to claim 14, wherein said second processor consumes less of the thermal and power budget than said first processor.

17. A system for the frequency management of processors in a multi-processor computer comprising:
a master processor hosting applications that require a first power allocation, said master processor operated at a first frequency, wherein said master processor consumes a first portion of a thermal and power budget in said multi-processor computer based upon said first power allocation;
a slave processor hosting applications that require a second power allocation, said slave processor operated at a second frequency, wherein said slave processor consumes a second portion of the thermal and power budget in said multi-processor computer based upon said second power allocation; and
manual adjustment means for maintaining a frequency level of at least one of said master processor and said slave processor.

18. The system according to claim 17, wherein an overall power and thermal budget in said multi-processor computer is maintained by the management means.

19. The system according to claim 17, wherein said multi-processor computer is based on an architecture in which processor core frequency is asynchronous to bus operating frequency.

20. The system according to claim 17, wherein a thermal and power budget allocation is altered according to a change in the performance requirements for said master processor and said slave processor in said multi-processor computer.

21. The system according to claim 17, wherein said master processor runs processes that require a higher level of performance than said slave processor, and said master processor is run at a higher frequency than said slave processor.

22. The system according to claim 17, wherein said slave processor runs processes that require a lower level of performance than said master processor, and said slave processor is run at a lower frequency than said master processor.

* * * * *